US012028257B2

United States Patent
Jeong et al.

(10) Patent No.: US 12,028,257 B2
(45) Date of Patent: Jul. 2, 2024

(54) DEVICE AND METHOD FOR PROCESSING TRAFFIC IN WIRELESS COMMUNICATION SYSTEM

(71) Applicant: Samsung Electronics Co., Ltd., Suwon-si (KR)

(72) Inventors: Sangsoo Jeong, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 17/642,208

(22) PCT Filed: Sep. 11, 2020

(86) PCT No.: PCT/KR2020/012287
§ 371 (c)(1),
(2) Date: Mar. 10, 2022

(87) PCT Pub. No.: WO2021/049899
PCT Pub. Date: Mar. 18, 2021

(65) Prior Publication Data
US 2022/0321481 A1   Oct. 6, 2022

(30) Foreign Application Priority Data
Sep. 11, 2019 (KR) .................. 10-2019-0113071

(51) Int. Cl.
*H04L 47/00*   (2022.01)
*H04L 47/20*   (2022.01)
(Continued)

(52) U.S. Cl.
CPC ............ *H04L 47/20* (2013.01); *H04L 47/825* (2013.01); *H04W 60/04* (2013.01)

(58) Field of Classification Search
None
See application file for complete search history.

(56) References Cited

U.S. PATENT DOCUMENTS

| 2019/0116546 A1 | 4/2019 | Kang et al. |
| 2019/0124508 A1 | 4/2019 | Watfa et al. |

(Continued)

FOREIGN PATENT DOCUMENTS

| EP | 3697047 A1 | 8/2020 |
| KR | 10-2019-0002462 A | 1/2019 |

(Continued)

OTHER PUBLICATIONS

"3rd Generation Partnership Project; Technical Specification Group Services and System Aspects; Study on Enhancements to the Service-Based Architecture (Release 16)", 3GPP TR 23.742 V16.0.0 (Dec. 2018), 131 pages.

(Continued)

*Primary Examiner* — Gerald A Smarth

(57) ABSTRACT

The present disclosure relates to a 5th generation (5G) or pre-5G communication system for supporting a higher data transmission rate after a 4th generation (4G) communication system such as long-term evolution (LTE). An operating method of a device for a user plane function (UPF) in a core network of a wireless communication system may include receiving rule information for processing a packet from a device for a session management function (SMF), processing a packet including user traffic received from a first device based on the rule, and transmitting the processed packet to a second device. Herein, first device or the second device may be a different device which performs a function related to a user plane.

15 Claims, 10 Drawing Sheets

(51) Int. Cl.
   *H04L 47/70* (2022.01)
   *H04W 60/04* (2009.01)

(56) References Cited

U.S. PATENT DOCUMENTS

| | | | |
|---|---|---|---|
| 2019/0158408 A1 | 5/2019 | Li et al. | |
| 2019/0261211 A1 | 8/2019 | Wu et al. | |
| 2020/0145876 A1* | 5/2020 | Dao | H04L 12/1407 |
| 2020/0244710 A1* | 7/2020 | Patil | H04L 65/1073 |
| 2020/0266928 A1 | 8/2020 | Yeo et al. | |
| 2020/0351984 A1* | 11/2020 | Talebi Fard | H04W 76/40 |
| 2020/0389935 A1 | 12/2020 | Jeong et al. | |
| 2022/0200813 A1* | 6/2022 | Thiebaut | H04W 4/24 |

FOREIGN PATENT DOCUMENTS

| | | | |
|---|---|---|---|
| KR | 10-2019-0043079 A | 4/2019 | |
| KR | 10-2020-0141336 A | 12/2020 | |
| WO | 2019/091345 A1 | 5/2019 | |
| WO | WO-2020034930 A1 * | 2/2020 | H04W 36/0033 |
| WO | WO-2021001051 A1 * | 1/2021 | H04L 45/0377 |
| WO | WO-2021136212 A1 * | 7/2021 | H04L 12/4633 |

OTHER PUBLICATIONS

Supplementary European Search Report dated Aug. 12, 2022 in connection with European Patent Application No. 20 86 3331, 12 pages.
International Search Report and Written Opinion of the International Searching Authority dated Dec. 21, 2020, in connection with International Application No. PCT/KR2020/012287, 11 pages.
3GPP TS 23.501 V16.1.1 (Jun. 2019), Technical Specification, 3rd Generation Partnership Project; Technical Specification Group Services and System Aspects; Procedures for the 5G System; Stage 2 (Release 16), Jun. 2019, 372 pages.
3GPP TS 23.502 V16.1.1 (Sep. 2019), Technical Specification, 3rd Generation Partnership Project; Technical Specification Group Services and System Aspects; Procedures for the 5G System; Stage 2 (Release 16), Jun. 2019, 495 pages.

* cited by examiner

DEVICE AND METHOD FOR PROCESSING TRAFFIC IN WIRELESS COMMUNICATION SYSTEM

CROSS-REFERENCE TO RELATED APPLICATIONS

This application is a 371 National Stage of International Application No. PCT/KR2020/012287, filed Sep. 11, 2020, which claims priority to Korean Patent Application No. 10-2019-0113071, filed Sep. 11, 2019, the disclosures of which are herein incorporated by reference in their entirety.

BACKGROUND

1. Field

The present disclosure generally relates to a wireless communication system, and more particularly, to an apparatus and a method for processing traffic in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The 5G communication system is considering supporting various services compared to the existing 4G communication system. For example, the 5G communication system may support an enhanced mobile broad band (eMBB) service, an ultra-reliable and low latency communication (URLLC) service, a massive machine type communication (mMTC) service, an evolved multimedia broadcast/multicast service (eMBMS), and the like.

To achieve a data throughput required by the 5G communication system, it is required to improve a processing speed of a core network as well as the wireless section. Accordingly, various structures for effectively processing data in the core network are under discussion.

SUMMARY

Based on the discussions described above, the present disclosure provides an apparatus and a method for processing user traffic in a wireless communication system.

According to various embodiments of the present disclosure, an operating method of a device for a user plane function (UPF) in a core network of a wireless communication system may include receiving rule information for processing a packet from a device for a session management function (SMF), processing a packet including user traffic received from a first device based on the rule, and transmitting the processed packet to a second device. Herein, first device or the second device may be a different device which performs a function related to a user plane.

According to various embodiments of the present disclosure, an operating method of a device for an SMF in a core network of a wireless communication system may include determining rules for at least one action performed by a plurality of devices respectively for a UPF, and transmitting information of the rules to a plurality of devices for the UPF.

According to various embodiments of the present disclosure, an operating method of a device for a network repository function (NRF) in a core network of a wireless communication system may further include receiving information of a UPF service provided by a plurality of devices for the UPF, by performing a network function (NF) registration procedure with a plurality of devices for the UPF and a device, transmitting a request message for requesting information of the plurality of the devices for the UPF, from a device for an SMF, and receiving a response message including information of the plurality of the devices for the UPF.

According to various embodiments of the present disclosure, an apparatus for a UPF in a core network of a wireless communication system may include a transceiver and at least one processor connected with the transceiver, and the at least one processor may control to receive information of a rule for processing a packet from a device for an SMF, process a packet including user traffic received from a first device based on the rule, and transmit the processed packet to a second device. Herein, the first device or the second device may be a different device which performs a function related to a user plane.

According to various embodiments of the present disclosure, an apparatus for an SMF in a core network of a wireless communication system may include a transceiver and at least one processor connected with the transceiver, and the at least one processor may determine rules for at least one action performed in a plurality of devices respectively for a UPF, and control to transmit information of the rules to the plurality of the devices for the UPF.

According to various embodiments of the present disclosure, an apparatus for an NRF in a core network of a wireless communication system may include a transceiver and at least one processor connected with the transceiver, and the at least one processor may control to receive information of a UPF service provided by a plurality of devices for the UPF, by performing an NF registration procedure with a plurality of devices for the UPF and a device, transmit a request message for requesting information of the plurality of the devices for the UPF, from a device for an SMF, and receive a response message including information of the plurality of the devices for the UPF.

An apparatus and a method according to various embodiments of the present disclosure, may effectively process user traffic in a wireless communication system.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are only used to describe specific embodiments, and may not be intended to limit the scope of other embodiments. Singular expressions may include plural expressions unless the context clearly indicates otherwise. Terms used herein, including technical or scientific terms, may have the same meaning as commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

Various embodiments of the present disclosure described below describe a hardware approach by way of example. However, various embodiments of the present disclosure include a technology using both hardware and software, and thus the various embodiments of the present disclosure may not exclude a software-based approach. For example, a network function (NF) or NF services included in an embodiment of the present invention may be implemented as separate hardware, or may be implemented as software to run on a computing device (server).

Hereafter, the present disclosure relates to an apparatus and a method for processing traffic of a service in a wireless communication system.

Terms indicating signals, terms indicating channels, terms indicating control information, terms indicating network entities or NFs, terms indicating components of a device and the like used in the following explanations are exemplified for convenience of description. Hence, the present disclosure is not limited to the terms to be described, and other terms having the same technical meaning may be used.

Terms indicating access nodes, terms indicating terms indicating network entities or NFs, terms indicating messages, terms indicating interfaces between network entities, terms indicating various identification information and the like used in the following explanations are provided as examples for convenience of description. Hence, the present disclosure is not limited to the terms to be described, and other terms having the same technical meaning may be used.

In addition, the present disclosure describes various embodiments using terms used in some communication standard (e.g., 3rd generation partnership project (3GPP)), but this is only an example for description. Various embodiments of the present disclosure may be easily modified and applied in other communication systems.

Figure 1:
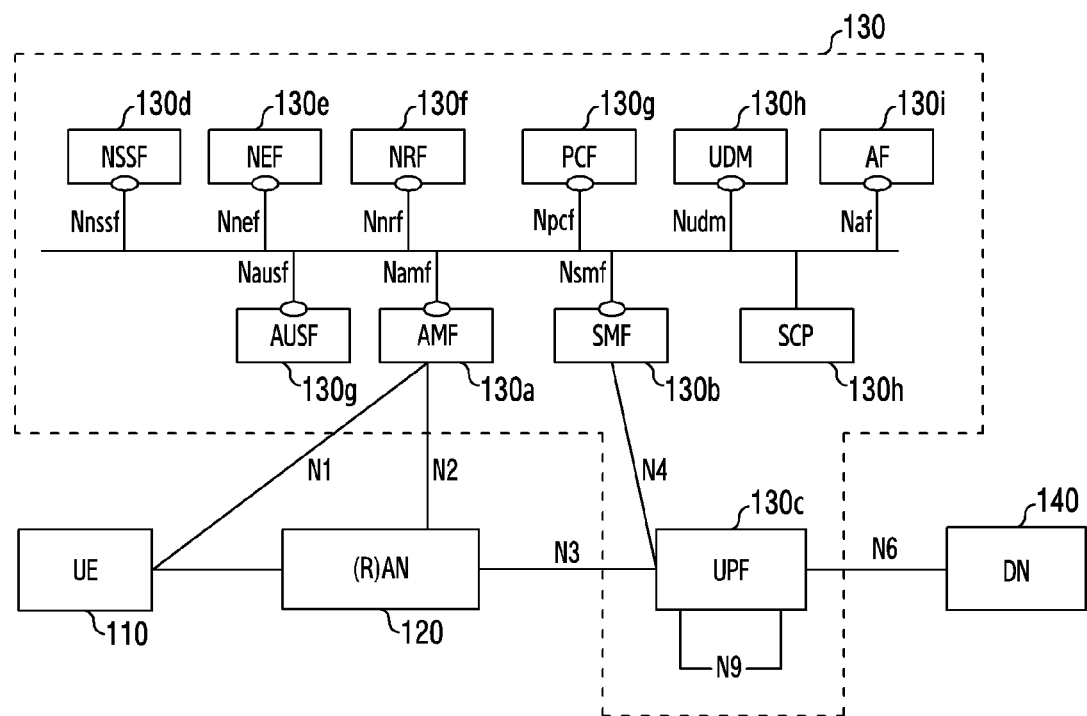
FIG. 1 illustrates a wireless communication system according to various embodiments of the present disclosure.

FIG. 1 illustrates a wireless communication system according to various embodiments of the present disclosure.

Referring to FIG. 1, the system includes a user equipment (UE) 100, a radio access network (RAN) 120, a core network 130, and a data network (DN) 140. The core network 130 includes an access and mobility management function (AMF) 130a, a session management function (SMF) 130b, a user plane function (UPF) 130c, a network slice selection function (NSSF) 130d, a network exposure function (NEF) 130e, a network repository function (NRF) 130f, a policy control function (PCF) 130g, a unified data management (UDM) 130h, an application function (AF) 130i, an authentication server function (AUSF) 130g, and a service communication proxy (SCP) 130h.

The UE 110 is a device used by a user, and communicates with a base station included in the RAN 120 over a radio channel. Besides the UE, the UE 110 may be referred to as a 'terminal', a 'mobile station', a 'subscriber station', a 'remote terminal', a 'wireless terminal', a 'user device' or other term having technically equivalent meaning.

The RAN 120 is a network directly connected to a user device (e.g., the UE 110), and is an infrastructure which provides radio access to the UE 110. The RAN 120 includes a set of a plurality of base stations, and the plurality of the base stations may perform communication through an interface formed therebetween. At least some of the interfaces between the plurality of the base stations may be wired or wireless. The base station may have a structure divided into a central unit (CU) and a distributed unit (DU). In this case, one CU may control a plurality of DUs. Herein, besides the base station, the base station may be referred to as an 'access point (AP)', an 'eNodeB (eNB)', a '5th generation (5G) node', a 'next generation node B (gNB)', a 'wireless point', a 'transmission/reception point (TRP)' or other term having the technically identical meaning.

The core network 130, which is a network which manages the whole system, controls the RAN 120 and processes data and control signals for the UE 110 transmitted and received via the RAN 120. The core network 130 performs various functions such as user plane and control plane control, mobility processing, subscriber information management, charging, and interworking with other system (e.g., a long term evolution (LTE) system). To perform the various functions as described above, the core network 130 may include a plurality of devices functionally separated with different NFs. The NFs (e.g., the SMF 130b, the UPF 130c, etc.) provided by the core network 130 are logical entities, and each NF may include at least one service. Logical entities may be implemented with a processor, hardware, firmware, or a combination thereof. Each logical entity may be provided by one device or a plurality of devices.

The AMF 130a is an NF which manages radio network access and mobility for the UE. The SMF 130b is an NF which manages a session for the UE. The session information includes quality of service (QoS) information, charging information, and packet processing information. The UPF 130c is an NF which processes user plane traffic, that is, packets transmitted and received by a customer over a communication network. The UPF 130c may be controlled by the SMF 130b. Although not depicted in FIG. 1, the system may include an unstructured data storage network function (UDSF). The UDSF is an NF which stores unstructured data, and may store or retrieve data of any type at a request of the NF.

Various NFs illustrated in FIG. 1 are defined from the logical perspective, and the NFs may be implemented with at least one hardware device. Hardware devices may establish a connection through a wired or wireless communication line, and transmit and receive necessary data. For example, each NF may be implemented as independent devices. As another example, two or more NFs of the NFs illustrated in FIG. 1 may be implemented as one device. As yet another example, one NF may be implemented as a set of a plurality of devices.

Meanwhile, one of the structural features of the communication network according to various embodiments of the present disclosure separates the control plane for services such as AMF and SMF and the user plane for processing actual traffic. In particular, the user traffic processing supported by the UPF, that is, the packet processing may be divided into various detailed processing functions as shown in the following [Table 1].

TABLE 1

| Function | Description |
| --- | --- |
| Basic packet processing | GTP-U (general packet radio system (GPRS) tunneling protocol-user plane) tunneling management, packet transmission between next generation radio access network (NG-RAN) and data network (DN) |
| Packet detection | A function of UPF to classify packets to process the packets. Determining whether a specific packet is included in which flow using application information (eg, application identifier), or information such as source/destination address and port included in the IP (internet protocol) header of the packet. |
| QoS enforcement | A function of service quality control:<br>Bit rate adjustment;<br>Packet gating, which discards packets or suspends transmission;<br>Flow marking that adds information about the identified flow to the packet as a result of packet detection;<br>Add identified service type to packet, Add service class |

TABLE 1-continued

| Function | Description |
| --- | --- |
| | indicator (SCI) |
| Usage reporting | A function to record and report traffic usage/information such as traffic volume, duration, and event. Includes support function for billing. |
| Packet buffering | A function of buffering packets for a specific terminal and reporting status information on packet arrival |
| Multi-access supporting | A function that supports simultaneous interworking of several types of access networks (eg 5 G and 4 G, 5 G and WiFi, etc.) |
| DPI(deep packet inspection) | A function to analyze the packet in detail and identify what kind of service/content it is |

Among the processing functions illustrated in [Table 1] above, the usage report function may additionally exist for other functions. That is, the usage reporting function may be added to other function which requires result reporting. For example, the usage report function may be performed together with the packet buffering function and the DPI function.

Hereafter, in various embodiments of the present disclosure, one packet processing function or module may be referred to as a 'UPF service'. The UPF service may be understood to correspond to each of the various packet processing detailed functions described above. For example, the QoS enforcement function corresponds to the UPF 'QoS enforcement service'. In addition, additional packet processing functions other than the above-described various packet processing detailed functions, for example, a network address translation (NAT) function, a virtual local area network (LAN) support function, and so on may be further supported.

One UPF instance may support one or more UPF services. If each UPF service is implemented in the form of an identifiable instance, the UPF service may be referred to as a 'UPF service instance'. UPF service instances providing the same service may be grouped into a UPF service set. UPF service instances belonging to one UPF service set may exchange or share context with each other, and provide the same service. In addition, the UPF instances providing the same service may together construct the UPF set, and UPF instances belonging to one UPF set may exchange or share context and provide the same service. In addition, even if the UPF service or the UPF instance changes according to mobility or network state change of the UE, service continuity for the UE or IP address preservation may be supported between the UPF instances belonging to the same UPF service set or the UPF set.

The UPF instance may be identified by realizing the UPF which is the NF defined in the 3GPP standard. That is, the UPF instance may be understood as a hardware device implemented to perform a calculation for at least one UPF service and to transmit and receive information. Alternatively, the UPF instance may be understood as an instance or a process of software executed on a physical hardware device in a virtualized system. In this case, it may be understood that the UPF instance operates as a device (e.g., a virtual machine) equivalent to a hardware device in terms of functionality or interworking with an external device. Accordingly, the UPF instance may be referred to as a 'UPF device' or a 'UPF node'. That is, the UPF device or the UPF node may be understood as an instance in the virtualized system. One UPF may support one or more UPF services, and may be separated and implemented as at least one UPF service instance of the identifiable form, by realizing each of the UPF services. If the UPF is implemented as the UPF instance, the UPF service instance may be included in the UPF instance. Hence, in describing various embodiments of the present disclosure, terms such as 'UPF', 'UPF instance', 'UPF service instance', 'UPF device', and 'UPF node' may be used interchangeably.

In addition, in the present disclosure, a target detected and matched for a specific packet is expressed as a flow. Herein, the flow may be used not only as a service data flow indicating a data flow for a specific service, but also as an expression indicating a specific service application.

Figure 2:
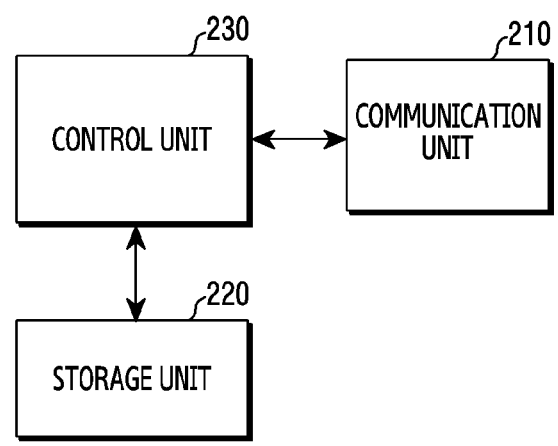
FIG. 2 illustrates a configuration of a core network device in a wireless communication system according to various embodiments of the present disclosure.

FIG. 2 illustrates a configuration of a core network device in a wireless communication system according to various embodiments of the present disclosure. The structure illustrated in FIG. 2 may be understood as a configuration of a device for providing at least one of the AMF, the UPF, the NSSF, the NEF, the NRF, the NCF, the UDM, the AF, the AUSF, the SMF, and the SCP of FIG. 1 or one function or service of a plurality of instances separated from them. A term such as ' . . . unit' or ' . . . er' used hereafter indicates a unit for processing at least one function or operation, and may be implemented using hardware, software, or a combination of hardware and software.

Referring to FIG. 2, the core network device includes a communication unit 210, a storage unit 220, and a control unit 230.

The communication unit 210 provides an interface for communicating with other devices in the network. That is, the communication unit 210 converts a bit stream transmitted from the core network device to other device into a physical signal, and converts a physical signal received from other device into a bit stream. That is, the communication unit 210 may transmit and receive signals. Accordingly, the communication unit 210 may be referred to as a modem, a transmitter, a receiver, or a transceiver. In this case, the communication unit 210 enables the core network device to communicate with other devices or systems via a backhaul connection (e.g., wired backhaul or wireless backhaul) or over the network.

The storage unit 220 stores data such as a basic program, an application program, and setting information for the operation of the core network device. The storage unit 220 may include a volatile memory, a nonvolatile memory or a combination of a volatile memory and a nonvolatile memory. In addition, the storage unit 220 provides the stored data at a request of the control unit 230.

The control unit 230 controls general operations of the core network device. For example, the control unit 230 transmits and receives signals through the communication unit 210. In addition, the control unit 230 invokes and executes a command stored in the storage unit 220, and records and reads data. For doing so, the control unit 230 may include at least one processor. According to various embodiments, the control unit 230 may control the core network device to perform operations according to various embodiments to be described.

Figure 3:
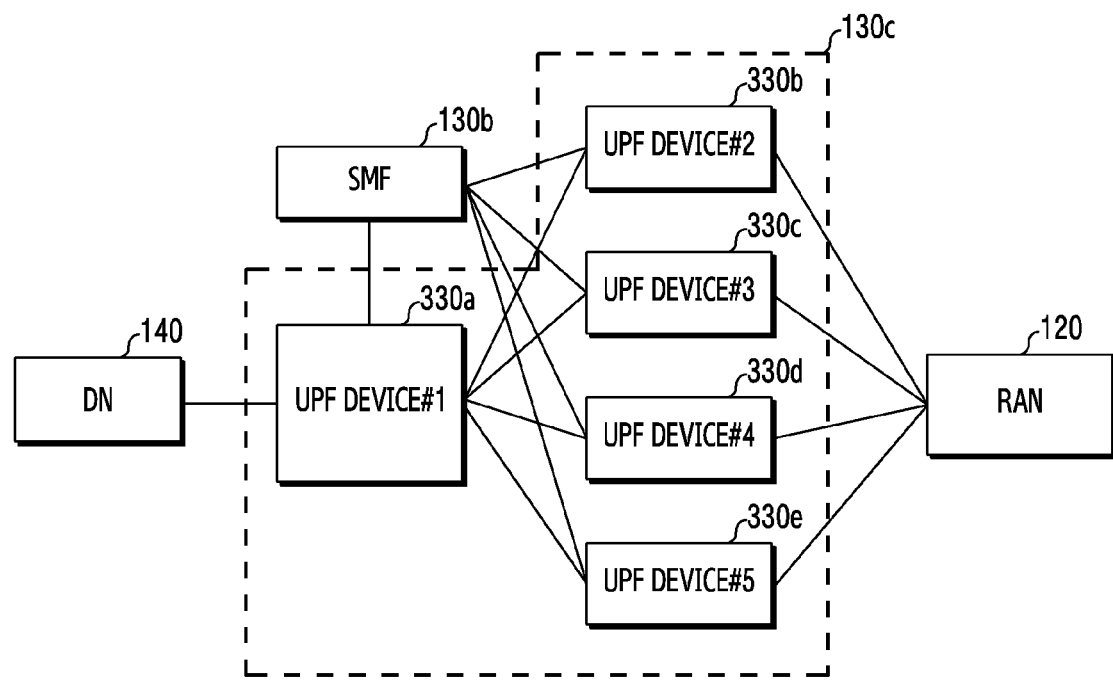
FIG. 3 illustrates an example of a user plane function (UPF) connection structure in a wireless communication system according to various embodiments of the present disclosure.

FIG. 3 illustrates an example of a UPF connection structure in a wireless communication system according to various embodiments of the present disclosure. FIG. 3 illustrates the structure in which the UPF 130c is divided into a plurality of UPF services 330a through 330e. In some cases, the plurality of the UPF services 330a through 330e illustrated in FIG. 3 may be understood as a plurality of UPF instances or devices.

Referring to FIG. 3, the UPF 130a is connected to the RAN 120, the SMF 130b, and the DN 140, and includes the plurality of the UPF services 330a through 330e.

The UPF 130a processes user traffic between the DN 140 and the RAN 120. In addition, the UPF 130a performs the packet processing function such as QoS control, usage reporting such as charging, and packet buffering. According to an embodiment, the whole packet processing process is supported by a network of the UPF services 330a through 330e having different functions. For example, if a specific service data flow needs the charging, the DPI, and the QoS control, traffic belonging to the corresponding service may be processed by the UPF services 330a through 330e which provide the corresponding function and are logically divided. At this time, specific UPF operations such as a type of the packet processing performed by the UPF services 330a through 330e and a path for forwarding the processed packet may be controlled by a rule forwarded by the SMF 130b.

According to various embodiments, a process of processing the packet at the plurality of the separated UPF services 330a through 330e may be largely divided into two steps as follows.

The first step is to perform packet detection/mapping. The UPF receiving the packet classifies the packet according to a set packet detection rule, and maps the packet to the flow according to the classification result. That is, the packet detection may be understood as mapping a corresponding packet to a specific flow, using information of the specific packet. In so doing, the flow may be a service data flow for the service-based control.

The second step is to perform the packet processing. The UPF receiving the packet processes the packet according to a set action rule. In this case, the action which the UPF may perform may include at least one of the QoS enforcement, the packet buffering, the usage report, and the forward according to characteristics. If low mapping information is obtained through the first step and the action rule to perform for each flow is obtained, the UPF may perform the flow-based action without separate packet detection/mapping. If there is no mapping information for each flow, or if the UPF has a separate packet detection rule and its associated action rule, the UPF may perform the packet detection/mapping to distinguish a target for the action.

Depending on the service type and the rule set from the SMF, specific packets and flows may be repeatedly processed through the first step and the second step, or may be processed by various combinations. For example, after passing through the first step once, actions of different types may be sequentially performed in the second step.

As shown in FIG. 3, the UPF may be divided into the plurality of the entities. FIG. 3 illustrates that the UPF is divided based on the packet processing function or service. However, according to another embodiment, the UPF may be divided based on a different criterion.

For example, the UPF may be divided based on a computation amount. In this case, for a function having a relatively greater computation amount than other functions, a plurality of entities performing the corresponding function may be defined.

As another example, the UPF may be divided based on the application or the service (a service provided to the user other than the UPF service). Since a function combination required on the UPF may differ according to the type of the application or the service, the UPF may be divided such that each entity or entity subset has at least one function required for a specific application.

It is apparent that other criterion than the above-described criteria may be applied, according to various embodiments. Further, a plurality of criteria may be applied jointly.

Figure 4:
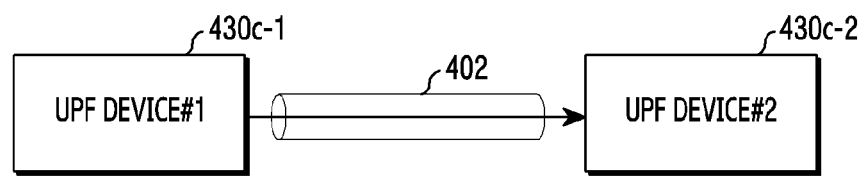
FIG. 4 illustrates an example of a packet forwarding scheme in a wireless communication system according to various embodiments of the present disclosure.

FIG. 4 illustrates an example of a packet forwarding scheme in a wireless communication system according to various embodiments of the present disclosure. FIG. 4 illustrates the packet forwarding using a tunnel.

Referring to FIG. 4, a UPF device #1 430c-1 and a UPF device #2 430c-2 connected to each other may transmit and receive a packet. According to an embodiment, if the UPF device #1 430c-1 performs the packet detection, and is to forward the packet to the UPF device #2 430c-2 as a result of the packet detection, that is, together with flow information, a method of forwarding the flow information which is the detection result to the UPF device #2 430c-2 is required. In the present embodiment, a tunnel 402 is established for each specific flow, and packets belonging to the corresponding flow are forwarded through the corresponding tunnel 402. At this time, the flow information (e.g., a flow identifier) may be included in a header of the packet forwarded through the tunnel 402 established between the UPF device #1 430c-1 and the UPF device #2 430c-2. Alternatively, in establishing the tunnel 402 between the UPF device #1 430c-1 and the UPF device #2 430c-2, if identifying and sharing a relationship between the specific tunnel identifier and the flow identifier, the UPF device #1 430c-1 may indicate the flow through the tunnel identifier.

A rule for taking an action for a specific flow may be set at the UPF device #2 430c-2. The UPF device #2 430c-2 does not perform separate packet detection using the received flow information, and processes the packet according to the corresponding action rule. This procedure may be applied even if a plurality of packet processing actions is required. If one UPF may support two or more packet processing functions (e.g., UPF services), the corresponding UPF may perform two or more packet processing operations using the received flow information. If two or more packet processing functions are supported in two or more UPFs separately, the UPFs may be sequentially connected and perform the respective packet processing operations. In this case, a scheme of expressing the flow information using the above-described tunnel may be adopted.

In such a scheme, it is advantageous that the packet detection having high computational complexity is performed only once in the UPF operation, and the UPF adequate for various service characteristics may be divided or flexibly deployed.

Figure 5:
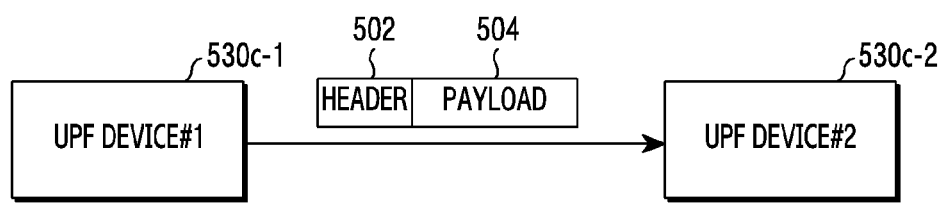
FIG. 5 illustrates another example of a packet forwarding scheme in a wireless communication system according to various embodiments of the present disclosure.

FIG. 5 illustrates another example of a packet forwarding scheme in a wireless communication system according to various embodiments of the present disclosure. FIG. 5 illustrates the packet forwarding using a header.

Referring to FIG. 5, flow information which is a packet detection result is included in a header 502 of a packet transmitted between a UPF device #1 530c-1 and a UPF device #2 530c-2. In other words, the packet includes the header 502 and a payload 504, and the header 502 may include the flow information. That is, in the present embodiment, the flow information obtained by the packet detection is forwarded without separate tunneling. If separate tunneling (e.g., GTP-U turner, etc.) is applied based on a PDU session between the UPF device #1 530c-1 and the UPF device #2 530c-2, various flows may be included in the corresponding tunnel, and since the tunnel and the tunnel head may not be used to forward the flow information, if the IP is used, the flow information may be forwarded to a next UPF by being inserted into an IP header or a layer 2 (L2) header. If using the IP header, the flow information may be forwarded through a DSCP field, a traffic class or a flow label field. If using the L2 header, the flow information may be forwarded through a tag field or an etherType field. For doing so, while the UPF device #1 530c-1 and the UPF device #2 530c-2 generate a PDU session, information of how to forward the flow information and flow identifier information may be exchanged.

The rule for taking action for a specific flow may be set in the UPF device #2 430c-2. The UPF device #2 430c-2 does not perform separate packet detection using the received flow information, and processes the packet according to the corresponding action rule. This procedure may be applied even if a plurality of packet processing actions is required. If one UPF may support two or more packet processing functions (e.g., UPF services), the corresponding UPF may perform two or more packet processing operations using the received flow information. If two or more packet processing functions are supported separately by two or more UPFs, the UPFs may be sequentially connected and perform the respective packet processing operations. In this case, the scheme of expressing the flow information using the above-described tunnel may be employed.

In such a scheme, it is advantageous that the packet detection having high computational complexity is performed only once in the UPF operation, and the UPF adequate for various service characteristics may be divided or flexibly deployed.

As in the embodiments explained with reference to FIG. 4 and FIG. 5, the flow information between two UPF devices may be identified by the information included in the used tunnel or header. If a plurality of UPF services is provided by one UPF device, that is, one UPF instance, the flow information exchange between the UPF services may be forwarded using an internal function (e.g., an application program interface (API)). For example, the flow information may be indicated using at least one parameter used by the API.

Figure 6:
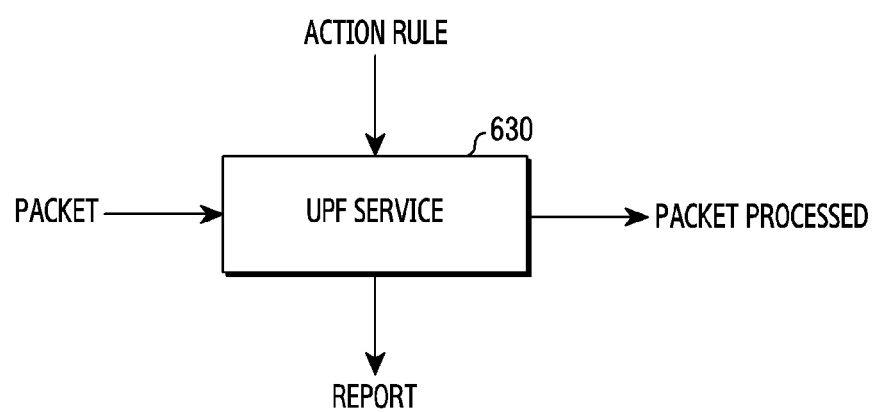
FIG. 6 illustrates an example of packet processing in a wireless communication system according to various embodiments of the present disclosure.

FIG. 6 illustrates an example of packet processing in a wireless communication system according to various embodiments of the present disclosure. FIG. 6 illustrates the packet forwarding using the header. FIG. 6 illustrates input and output operations for a specific UPF to provide the UPF service, that is, the service for the packet processing. In FIG. 6, the horizontal axis represents the user plane, and the vertical axis represents the control plane.

Referring to FIG. 6, the control plane is a region where the UPF receives the rule for the packet processing, or exchanges information through an interface for forwarding specific information, and may correspond to is an N4 reference point between the SMF and the UPF. The user plane may correspond to N3 associated with the NG-RAN, N9 associated with other UPF, and N6 reference point associated with the DN. In the example of FIG. 6, it is assumed that a UPF service 630 performs an operation of processing a packet of which the packet detection is completed.

As shown in FIG. 6, the UPF service 630 receives rule information for the packet processing from the SMF. At this time, the rule may include a relationship between a flow identifier for identifying a packet for the packet processing, and an action indicating the packet processing operation. If actions of different types need to be set, the rule information received by the UPF service 630 may be classified per action. For example, if the UPF service 630 performs the QoS enforcement and the usage reporting, information of a QoS enforcement rule (QER) and a usage reporting rule (URR) may be received. As another example, if the UPF service 630 processes a packet and then needs to forward the packet to other entity, forwarding action rule (FAR) information may be received. In common, the rule received by the service 630 from the SMF may include identifier(s) for flows mapped to target packets. In addition, the rule information may include order or priority information by which various rules received by the UPF service 630 are applied. If no action rule is explicitly matched and an action rule basically performed is required, the action basically performed may be set or received for any packet or flow with the lowest priority.

The UPF service 630 receives an actual user data packet through a path on the user plane. In this case, the UPF service 630 may identify the flow corresponding to the received packet without a separate packet detection operation, based on the tunnel of the received packet, or based on the flow identifier included in the packet header. The UPF service 630 identifies whether there is the action rule corresponding to the flow identifier according to priority, performs the action if there is the mapped action, and repeats identifying and performing operation until there are no more action rules to be matched.

If the action for the packet processing is an action for reporting specific information (e.g., charging, usage, etc.) to other entity, the UPF service 630 collects/processes data to report according to the set reporting rule, and reports corresponding information if the reporting condition is satisfied. If the action rule for the packet processing is to forward the packet to other entity, the UPF service 630 sets destination and header information according to the FAR, and forwards the packet to another UPF service, the DN or the RAN.

Figure 7:
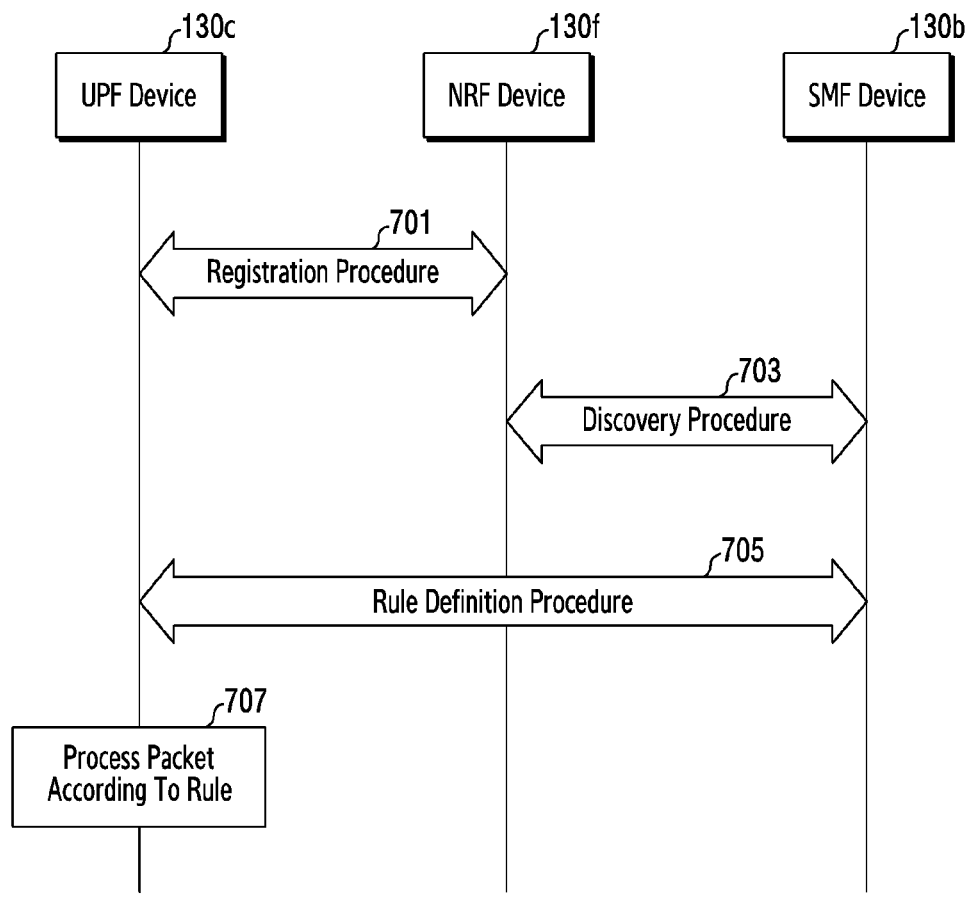
FIG. 7 illustrates an example of a signal exchange diagram for processing a packet in a wireless communication system according to various embodiments of the present disclosure.

FIG. 7 illustrates an example of a signal exchange diagram for processing a packet in a wireless communication system according to various embodiments of the present disclosure.

Referring to FIG. 7, in step 701, the UPF device 130c performs a registration procedure with the NRF device 130f. Through the registration procedure, the UPF device 103c transmits information of the UPF service provided by the UPF device 103c to the NRF device 103f. Hence, the NRF device 130f may identify the presence of the UPF device 130c and the UPF information which may be provided by the UPF device 130c, and register information of the UPF device 130c.

In step 703, the SMF device 130b performs a discovery procedure with the NRF device. The discovery procedure includes operations for the SMF device 130b to identify at least one UPF device, that is, UPF instance which provides at least one UPF service required for processing a packet of the UE. Thus, the SMF device 130b may obtain at least one UPF device information required to process packets on a flow corresponding to a specific session of the UE.

In step 705, the UPF device 130c and the SMF device 130b perform a rule definition procedure. The rule definition procedure includes operations for the SFM device 130b to generate a rule and forward the generated rule to the UPF device 130c. Herein, rule information forwarded from the SMF device 130b to the UPF device 130c may be all or part of the rule.

In step 707, the UPF device 130c processes the packet according to the rule. The UPF device 130c may identify the UPF service and detailed rules to be performed by the UPF device 130c, based on the rule information received from the SMF device 130b, and process the packet according to the identified rules.

Figure 8:
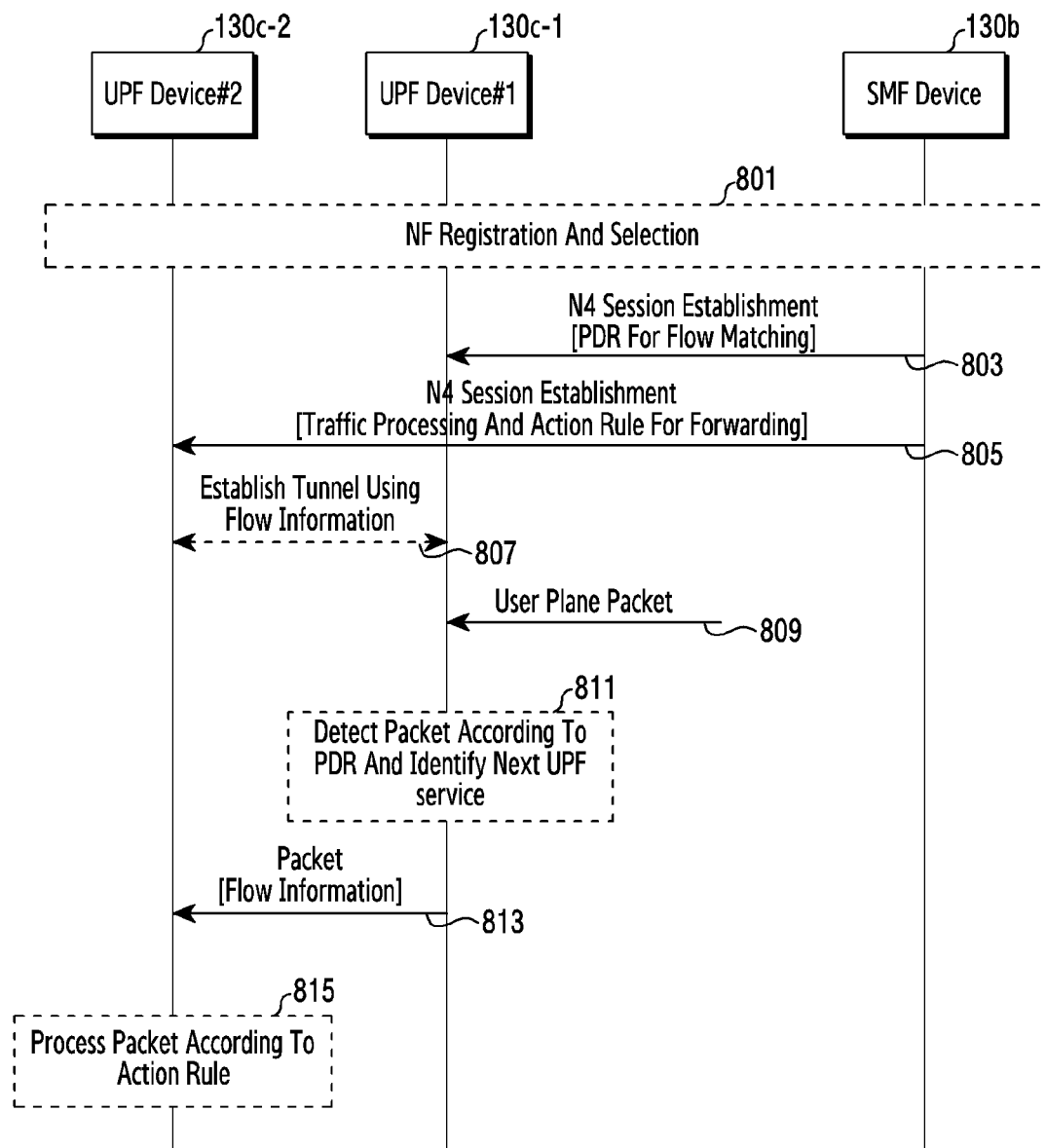
FIG. 8 illustrates an example of a signal exchange diagram if a packet is forwarded using tunneling in a wireless communication system according to various embodiments of the present disclosure.

FIG. 8 illustrates an example of a signal exchange diagram if a packet is forwarded using tunneling in a wireless communication system according to various embodiments of the present disclosure. FIG. 8 illustrates that two packet processing functions, that is, UPF services (e.g., packet detection, additional action) are performed. However, a procedure described below may be applied even if three or more packet processing functions are performed.

Referring to FIG. 8, in step 801, operations for NF registration and selection are performed. For example, a UPF device #1 130c-1 and a UPF device #2 130c-2 may register UPF service related information to an NRF device, and an SMF device 130b may perform an operation for selecting UPFs to process traffic for a specific service.

In step 803, the SMF device 130b transmits an N4 session establishment message to the UPF device #1 130c-1. In other words, the SMF device 130b forwards an N4 (PFCP) rule for specifically controlling the packet processing operation to be performed by the UPF device #1 130c-1. The N4 rule forwarding operation may be performed as part of a PDU session establishment process for a specific UE and a specific service (DNN). In this embodiment, it is assumed that the UPF device #1 130c-1 detects a packet and forwards the matched flow information to another UPF device, and accordingly the rule forwarded by the SMF device 130b includes a packet detection rule (PDR). The PDR includes one or more packet detection information (PDI) to be used for the packet detection, and may further include information for identifying the flow to which the matched packet belongs. The flow identification information may include a flow identifier to be included in the header or tunnel information to which the packet belongs. Alternatively, if a detection result and an additional packet processing operation are required, the FAR including a detailed rule for forwarding the packet to a next UPF device may be included. In this case, the PDR may not directly include the identifier for the matched flow, but may include a corresponding FAR ID for the packet detection result. In this case, the FAR should include information for identifying the flow, the packet may be forwarded according to the FAR corresponding to the packet after the packet detection, and the flow identification information may be added.

In step 805, the SMF device 130b transmits an N4 session establishment message to the UPF device #2 130c-1. In other words, the SMF device 130b forwards the N4 (PFCP) rule for specifically controlling the packet processing operation to be performed by the UPF device #2 130c-2. The N4 rule forwarding operation may be performed as part of the PDU session establishment process for a specific UE and a specific service (DNN). In this embodiment, it is assumed that the UPF device #2 130c-2 performs a specific action and forwards the processed packet to other entity, and accordingly the rule forwarded by the SMF device 130b includes the action rule for this. The action rule includes detailed parameters describing a specific packet processing operation, and may include a flow identifier for a target to be processed.

In step 807, the UPF device #1 130c-1 and the UPF device #2 130c-2 establish a tunnel. That is, if it is necessary to generate a separate tunnel or association, the UPF device #1 130c-1 and the UPF device #2 130c-2 may transmit and receive messages for the tunnel establishment. The tunnel establishment may be performed by direct signaling between the UPF device #1 130c-1 and the UPF device #2 130c-2, or may be carried out through the SMF device 130b.

In step 809, the UPF device #1 130c-1 receives a user plane packet from the associated object. Herein, the object forwarding the packet to the UPF device #1 130c-1 may be the RAN, the DN, or other UPF device. Also, the received packet may include uplink data or downlink data.

In step 811, the UPF device #1 130*c*-1 performs the packet detection and the flow matching on the received packet. If a plurality of PDRs is set, the UPF device #1 130*c*-1 determines whether there is the matching PDR according to the priority. If the packet is matched for the PDI of the PDR, the UPF device #1 130*c*-1 may allow other UPF to identify the flow using this if the PDR includes the flow information, or may perform the packet processing using the corresponding action rule if the PDR includes an ID of other associated action rule without the flow information. If the flow information is included in the action rule, the UPF device #1 130*c*-1 may allow other UPF to identify the flow using this.

In step 813, the UPF device #1 130*c*-1 forwards the packet to a next UPF device the UPF device #2 130*c*-2. At this time, the UPF device #1 130*c*-1 forwards the flow information together so that the UPF device #2 130*c*-2 obtains the packet detection result. The flow information may be forwarded explicitly or implicitly. For example, the packet may be forwarded through a specific tunnel generated for each flow.

In step 815, the UPF device #2 130*c*-2 processes the received packet. Specifically, the UPF device #2 130*c*-2 identifies the flow of the packet received from the UPF device #1 130*c*-1, and uses this to identify the action rule to be performed on the corresponding flow. If a plurality of action rules is set at the UPF device #2 130*c*-2, the UPF device #2 130*c*-2 identifies the action rule applicable to the corresponding flow according to the priority. The action rule may include configuration for performing one action type only once in one flow, not to generate duplicate actions for the same flow, or configuration allowing to apply the same action type to one flow multiple times with different detailed parameters depending on the service type and action characteristics. For example, the action type indicates the type of the packet processing service which may be provided by the UPF such as QoS enforcement, forwarding, buffering, and usage reporting.

Figure 9:
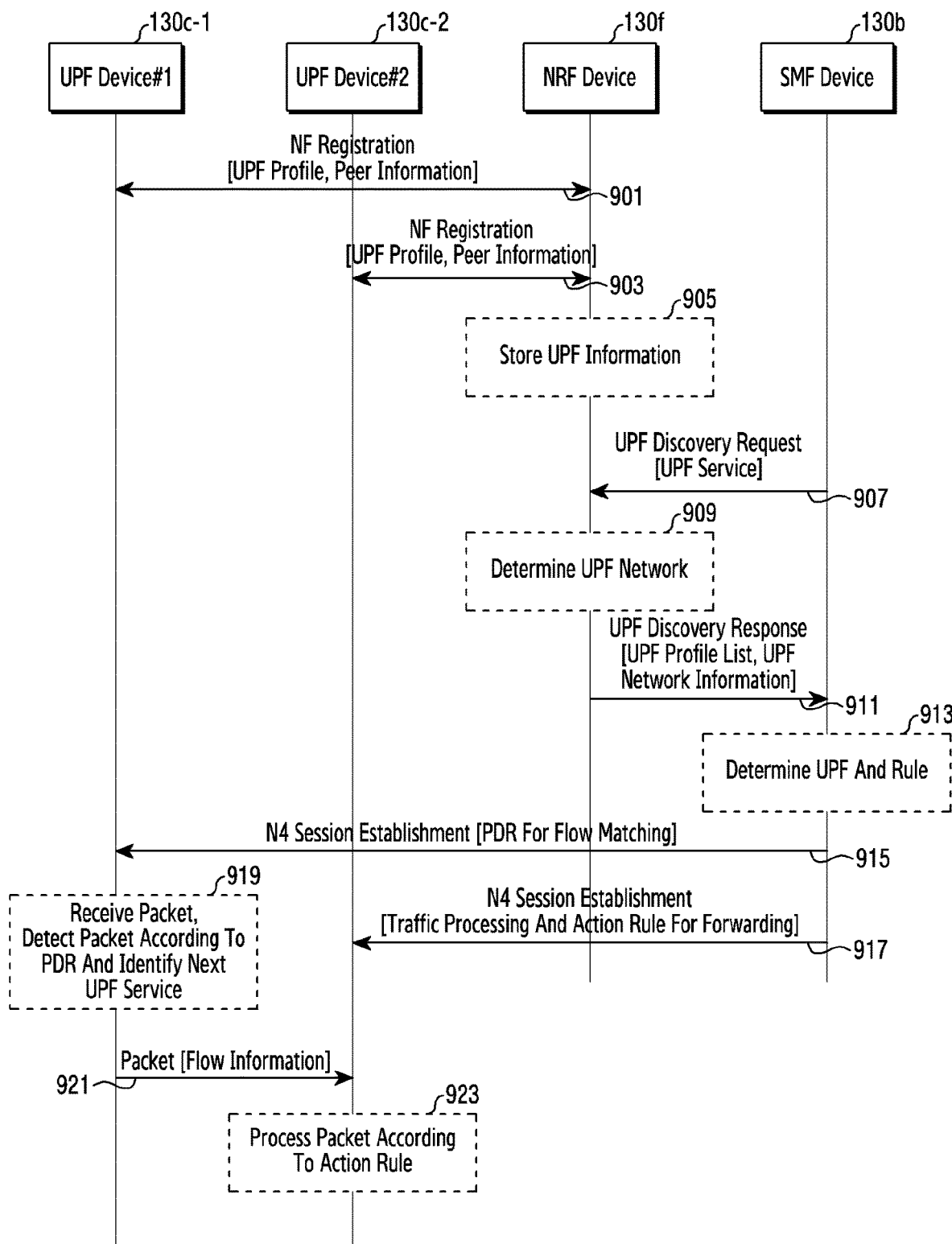
FIG. 9 illustrates an example of a signal exchange diagram if a packet is forwarded using a header in a wireless communication system according to various embodiments of the present disclosure.

FIG. 9 illustrates an example of a signal exchange diagram if a packet is forwarded using a header in a wireless communication system according to various embodiments of the present disclosure. FIG. 9 illustrates that two packet processing functions, that is, UPF services (e.g., packet detection, additional action) are conducted. However, a procedure described below may be applied even if three or more packet processing functions are performed.

Referring to FIG. 9, in step 901 and step 903, a UPF device #1 130*c*-1 and a UPF device #2 130*c*-2 each perform the NF registration procedure with an NRF device 130*f*. The UPF device #1 130*c*-1 and the UPF device #2 130*c*-2 each may forward NF profile and association information (e.g., peer information) to the NRF device 130*f* through the NF registration procedure. The NF profile may include information of a function (e.g., UPF service) and a maximum capacity supported by each of the UPF device #1 130*c*-1 and the UPF device #2 130*c*-2. The association information may include information of other network entity (e.g., another UPF device, the RAN, or the DN) for interworking with itself. In step 905, the NRF device 130*f* stores information received from the UPF device #1 130*c*-1 and the UPF device #2 130*c*-2.

In step 907, the SMF device 130*b* transmits an NF discovery request message for selecting at least one UPF device to the NRF device 130*f*. If the SMF device 130*b* stores sufficient information to select the UPF device or has already performed the UPF discovery procedure, the step 905 may be omitted. The NR discovery request message may include information of UPF services, that is, UPF functions required by the SMF device 130*b* for a specific application, service, or traffic.

In step 909, the NRF device 130*f* determines at least one UPF device according to a request of the SMF device 130*b*. Herein, the set of at least one UPF device may be referred to as a 'UPF network'. In step 911, the NRF device 130*f* transmits a UPF discovery response message including information of at least one selected UPF device to the SMF device 130*b*. In this case, the UPF discovery response message may include a candidate group of at least one UPF device for supporting the packet processing service requested by the SMF and association information between the UPF devices.

In step 913, the SMF device 130*b* selects UPF devices using the received information, the stored information, and configuration information, and generates an N4 (PFCP) rule for controlling each UPF. This embodiment assumes that the UPF device #1 130*c*-1 and the UPF device #2 130*c*-2 are selected.

In step 915, the SMF device 130*b* transmits an N4 session establishment message to the UPF device #1 130*c*-1. The N4 session establishment message includes a rule for the packet processing. In the present embodiment, the rule forwarded to the UPF device #1 130*c*-1 includes the PDR, and may further include other action rule (e.g., FAR, etc.) depending on whether to process an additional packet or the flow identifier determination.

In step 917, the SMF device 130*b* transmits an N4 session establishment message to the UPF device #2 130*c*-2. The N4 session establishment message includes the packet processing rule. In this embodiment, if the UPF device #2 130*c*-2 performs an action following the packet detection result performed by the UPF device #1 130*c*-1, the N4 rule forwarded to the UPF device #2 130*c*-2 may include the rule including the detailed action and an identifier for a target flow.

In step 919, the UPF device #1 130*c*-1 performs the packet detection and the flow matching on the received packet. If a plurality of PDRs is set, the UPF device #1 130*c*-1 determines whether there is the matching PDR according to priority. If the packet is matched for the PDI of the PDR, if the PDR includes flow information, the UPF device #1 130*c*-1 may allow other UPF to identify the flow using this, or may process the packet using the corresponding action rule if the PDR includes an ID of other associated action rule without the flow information. If the flow information is included in the action rule, the UPF device #1 130*c*-1 may allow other UPF to identify the flow using this.

In step 921, the UPF device #1 130*c*-1 forwards the packet to the UPF device #2 130*c*-2 which is a next UPF device. At this time, the UPF device #1 130*c*-1 forwards the flow information together so that the UPF device #2 130*c*-2 obtains the packet detection result. The flow information may be forwarded explicitly or implicitly. For example, the flow information may be included in the header of the packet.

In step 923, the UPF device #2 130*c*-2 processes the received packet. Specifically, the UPF device #2 130*c*-2 identifies the flow of the packet received from the UPF device #1 130*c*-1, and uses this to identify the action rule to be performed on the corresponding flow. If a plurality of action rules is set at the UPF device #2 130*c*-2, the UPF device #2 130*c*-2 identifies the action rule applicable to the corresponding flow according to the priority. The action rule may include configuration for performing one action type only once in one flow, not to generate duplicate actions for the same flow, or configuration allowing to apply the same action type to one flow multiple times with different detailed parameters depending on the service type and action characteristics. For example, the action type indicates the type of the packet processing service which may be provided by the UPF such as QoS enforcement, forwarding, buffering, and usage reporting.

In the procedure explained with reference to FIG. 9, for the operations such as NF registration and UPF discovery, the NRF device 130f stores and provides information. According to another embodiment, the NRF device 130f may be replaced with an SCP device. In this case, the UPF device #1 130c-1 and the UPF device #2 130c-2 may perform the NR registration procedure with the SCP device in step 901 and step 903, and the SMF device 130b may perform the UPF discovery procedure with the SCP device, in step 907 and step 911.

Figure 10:
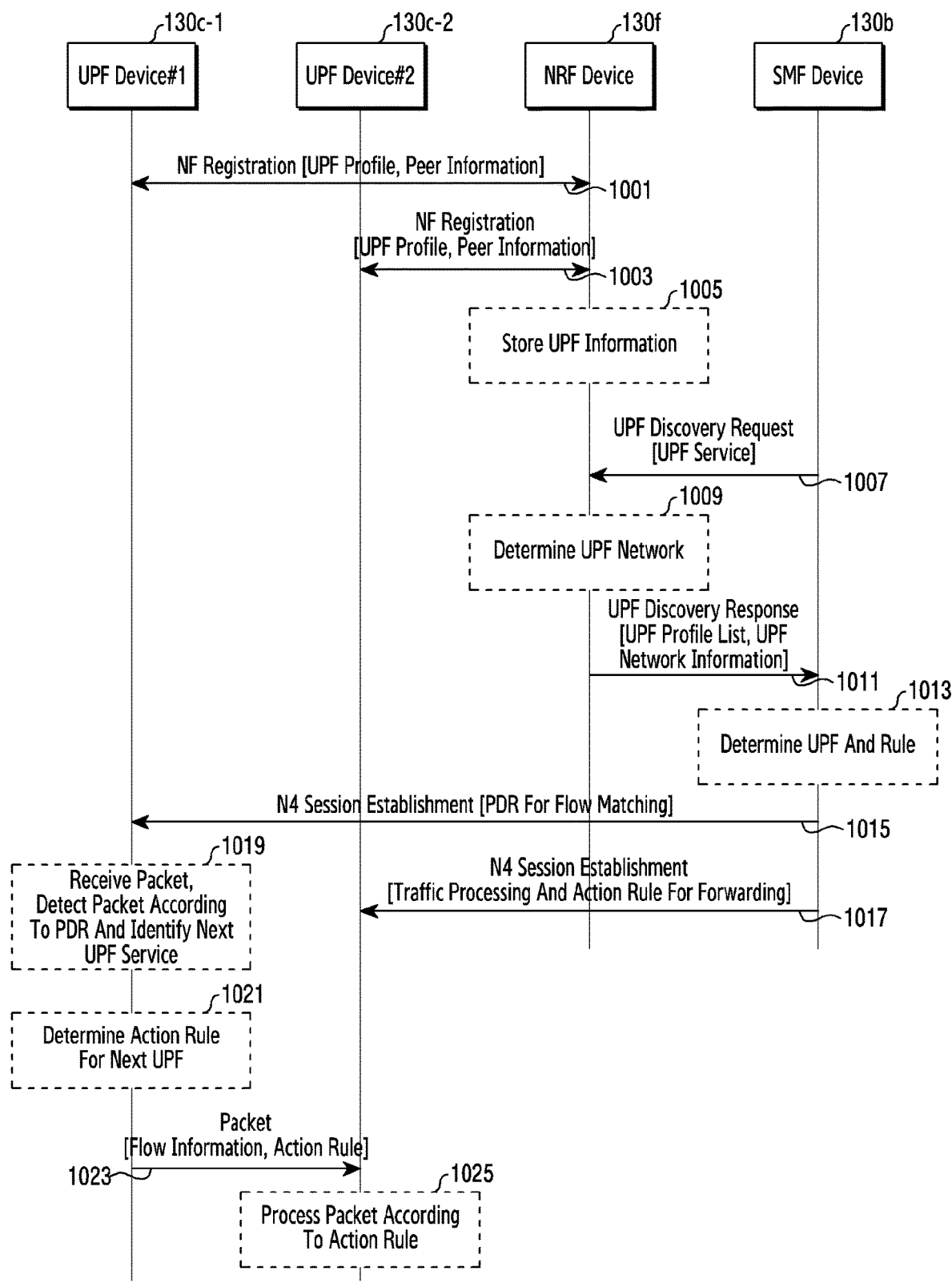
FIG. 10 illustrates yet another example of a signal exchange diagram if some rules are defined by a UPF device in a wireless communication system according to various embodiments of the present disclosure.

FIG. 10 illustrates yet another example of a signal exchange diagram if some rule is defined by a UPF device in a wireless communication system according to various embodiments of the present disclosure. FIG. 10 illustrates that two packet processing functions, that is, UPF services (e.g., packet detection, additional action) are conducted. However, a procedure described below may be applied even if three or more packet processing functions are performed.

Referring to FIG. 10, in step 1001 and step 1003, a UPF device #1 130c-1 and a UPF device #2 130c-2 each perform the NF registration procedure with an NRF device 130f. The UPF device #1 130c-1 and the UPF device #2 130c-2 each may forward NF profile and association information (e.g., peer information) to the NRF device 130f through the NF registration procedure. The NF profile may include information of a function (e.g., UPF service) and a maximum capacity supported by each of the UPF device #1 130c-1 and the UPF device #2 130c-2. The association information may include information of other network entity (e.g., another UPF device, the RAN, or the DN) for interworking with itself. In step 1005, the NRF device 130f stores information received from the UPF device #1 130c-1 and the UPF device #2 130c-2.

In step 1007, the SMF device 130b transmits an NF discovery request message for selecting at least one UPF device to the NRF device 130f. If the SMF device 130b stores sufficient information to select the UPF device or has already performed the UPF discovery procedure, step 905 may be omitted. The NR discovery request message may include information of UPF services, that is, UPF functions required by the SMF device 130b for a specific application, service, or traffic.

In step 1009, the NRF device 130f determines at least one UPF device according to a request of the SMF device 130b. Herein, the set of at least one UPF device may be referred to as a 'UPF network'. In step 1011, the NRF device 130f transmits a UPF discovery response message including information of at least one selected UPF device to the SMF device 130b. In this case, the UPF discovery response message may include a candidate group of at least one UPF device for supporting the packet processing service requested by the SMF and association information between the UPF devices.

In step 1013, the SMF device 130b selects UPF devices using the received information, the stored information, and configuration information, and generates an N4 (PFCP) rule for controlling the UPF devices. At this time, among the rules generated by the SMF device 130b, the rule forwarded to the UPF device #1 130c-1 may include not only the rules used by the UPF device #1 130c-1, but also all or part of the rule for the UPF device #2 130c-2 for receiving the packet processed by the UPF device #1 130c-1 and processing a subsequent action.

In step 1015, the SMF device 130b transmits an N4 session establishment message to the UPF device #1 130c-1. The N4 session establishment message includes a rule for the packet processing. In the present embodiment, the rule forwarded to the UPF device #1 130c-1 includes the PDR, and may further include other action rule (e.g., FAR, etc.) depending on whether to process an additional packet or the flow identifier determination.

In step 1017, the SMF device 130b transmits an N4 session establishment message to the UPF device #2 130c-2. The N4 session establishment message includes the packet processing rule. In this embodiment, if the UPF device #2 130c-2 performs an action following the packet detection result performed by the UPF device #1 130c-1, the N4 rule forwarded to the UPF device #2 130c-2 may include the rule including the detailed action and an identifier for a target flow.

In step 1019, the UPF device #1 130c-1 performs the packet detection and the flow matching on the received packet, and then identifies a next UPF service. In step 1021, the UPF device #1 130c-1 determines an action rule for the next UPF, that is, the UPF device #2 130c-2. Herein, the action rule determined by the UPF device #1 130c-1 is a rule which may be used together with the action rule of the UPF device #2 130c-2 provided from the SMF device 130b. That is, the UPF device #1 130c-1 may determine at least part of the detailed parameter or the action rule to be used by the UPF device #2 130c-2 to process a packet.

In step 1023, the UPF device #1 130c-1 forwards the packet to the UPF device #2 130c-2 which is the next UPF device. At this time, the UPF device #1 130c-1 forwards the flow information together so that the UPF device #2 130c-2 obtains the packet detection result. The flow information may be forwarded explicitly or implicitly. For example, the flow information may be included in the header of the packet. In addition, the packet may include information of at least part of the detailed parameter or the action rule to be used by the UPF device #2 130c-2 to process the packet. For example, the action rule information included in the packet may include an indicator indicating one of predefined rules, and information for changing a transmission path.

In step 1025, the UPF device #2 130c-2 processes the received packet. In so doing, the UPF device #2 130c-2 may process the packet using the action rule received or preset from the SMF device 130b and the flow information received from the UPF device #1 130c-1. If the UPF device #1 130c-1 forwards not only the flow information but also the rule or the detailed parameter for the packet processing, the UPF device #2 130c-2 may process the packet based on the rule provided by the UPF device #1 130c-1. If the action rule received or preset from the SMF device 130b conflicts with the rule provided from the UPF device #1 130c-1, the rule to apply first may differ depending on the UPF setting.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining some or all of those recording media. A plurality of memories may be included.

Also, the program may be stored in an attachable storage device accessible via a communication network such as Internet, Intranet, LAN, wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the invention are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The present disclosure generally relates to a wireless communication system, and more particularly, to an apparatus and a method for processing traffic in the wireless communication system.

The invention claimed is:

1. A method performed by a user plane function (UPF) node in a wireless communication system, comprising:
receiving, from a session management function (SMF) node, a message including information on a rule, wherein the information on the rule includes a packet detection rule (PDR), and a forwarding action rule (FAR);
receiving, from an entity associated with the UPF node, at least one packet comprising user traffic;
detecting the at least one packet comprising user traffic based on the PDR which includes information for matching the at least one packet with a flow; and
when the PDR does not include information for matching the at least one packet with the flow, transmitting, to an another UPF node, the at least one detected packet, wherein the another UPF node is selected based on the FAR.

2. The method of claim 1, further comprising:
transmitting, to a network repository function (NRF) node, information on a UPF service, wherein the SMF node determines the information on the rule based on the information on the UPF service.

3. The method of claim 2, wherein the information on the UPF service includes at least one of a network function (NF) profile or a peer information.

4. The method of claim 3, wherein the NF profile includes information on a function supported by the UPF node and maximum capacity supported by the UPF node.

5. The method of claim 1, further comprising:
determining at least one action rule for the another UPF node; and
transmitting, to the another UPF node, the determined at least one action rule.

6. A method performed by a session management function (SMF) node in a wireless communication system, comprising:
receiving, from a network repository function (NRF) node, information on a user plane function (UPF) service;
determining information on a rule including a packet detection rule (PDR) and a forwarding action rule (FAR) based on the information on the UPF service;
transmitting, to a UPF node, a message including the information on the rule, wherein the UPF node detects at least one packet based on the PDR; and
transmitting, to an another UPF node, a message including at least one action rule for packet processing based on a packet detection by the UPF node.

7. The method of claim 6, further comprising:
transmitting, to the NRF node, a discovery request message for identifying the UPF node and the another UPF node.

8. The method of claim 7, wherein the discovery request message includes information on a UPF function required by the SMF node.

9. The method of claim 6, wherein the information on the UPF service includes at least one of a network function (NF) profile or a peer information.

10. The method of claim 9, wherein the NF profile includes information on a function supported by the UPF node and maximum capacity supported by the UPF node.

11. A user plane function (UPF) node in a wireless communication system, comprising:
a transceiver; and
a controller coupled with the transceiver, and configured to:
receive, from a session management function (SMF) node, a message including information on a rule, wherein the information on the rule includes a packet detection rule (PDR) and a forwarding action rule (FAR),
receive, from an entity associated with the UPF node, at least one packet comprising user traffic,
detect the at least one packet comprising user traffic based on the PDR which includes information for matching the at least one packet with a flow, and
when the PDR does not include information for matching the at least one packet with the flow, transmit, to an another UPF node, the at least one detected packet, wherein the another UPF node is selected based on the FAR.

12. The UPF node of claim 11, wherein the controller is further configured to:
transmit, to a network repository function (NRF) node, information on a UPF service, wherein the SMF node determines the information on the rule based on the information on the UPF service.

13. The UPF node of claim 12, wherein the information on the UPF service includes at least one of a network function (NF) profile or a peer information.

14. The UPF node of claim 13, wherein the NF profile includes information on a function supported by the UPF node and maximum capacity supported by the UPF node.

15. The UPF node of claim 11, wherein the controller is further configured to:
- determine at least one action rule for the another UPF node, and
- transmit, to the another UPF node, the determined at least one action rule.

\* \* \* \* \*